Sheet 1 - 2 Sheets.
R. Brewer,
Tuyere,
N°. 2,857.   Patented Nov. 21, 1842
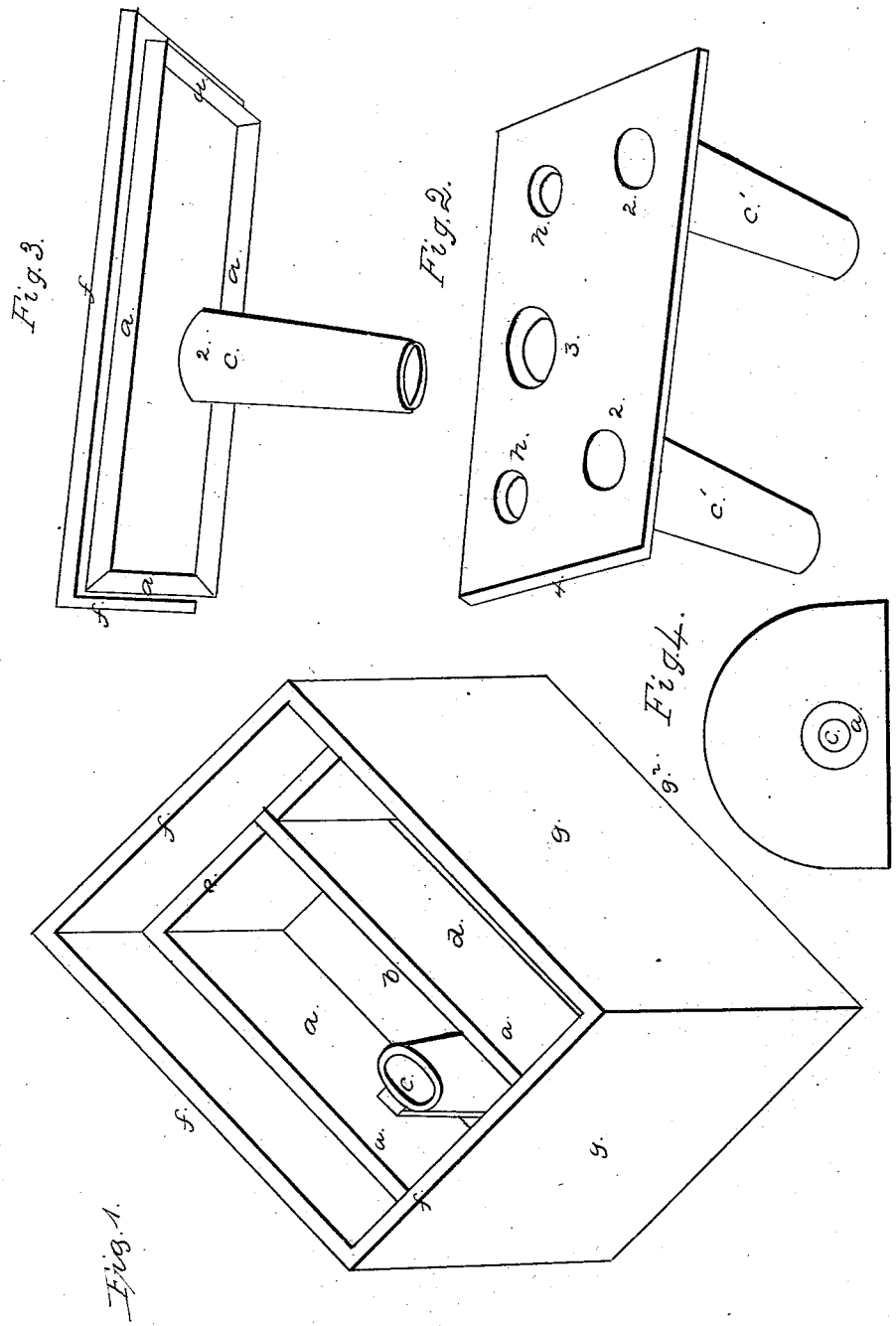

Sheet 2 - 2 Sheets.
R. Brewer,
Tuyere,
Nº 2,857.        Patented Nov. 21, 1842.
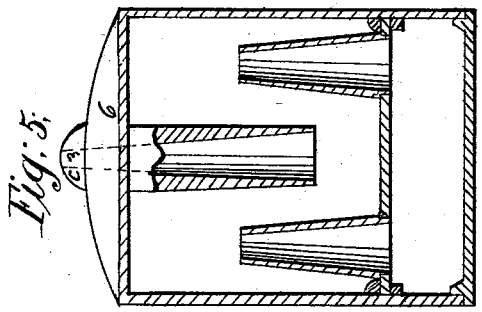
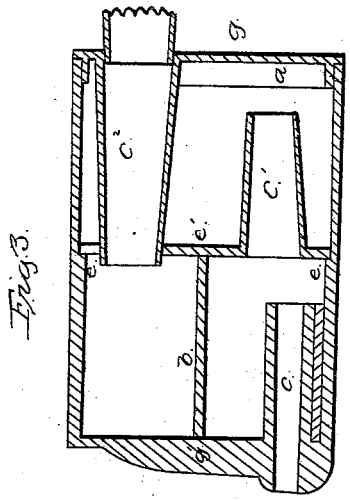

UNITED STATES PATENT OFFICE.

RICHARD BREWER, OF PLYMOUTH, OHIO.

TWYER.

Specification of Letters Patent No. 2,857, dated November 21, 1842.

*To all whom it may concern:*

Be it known that I, RICHARD BREWER, of Plymouth, in the county of Richland and State of Ohio, have invented a new and Improved Twyer-Iron for Blacksmiths' Forges; and I do hereby declare that the following is a full, clear, and exact description of my invention, reference being had to the accompanying drawings, forming a part of this specification.

Figure 1 represents an inside view of my air box with the partition plate ($e'$), and back plate ($g$) removed; Fig. 2, a view of the plate ($e'$) detached; Fig. 3, a view of the back plate ($g$) detached; Fig. 4, a view of the air box, in section showing the partition plates and tubes in their proper places.

The nature of my invention consists in forming my air box into three divisions, which I designate by the names of upper, lower and back chambers; I connect these chambers with each other; in such a manner as to produce a double reaction in the box, before it is allowed to escape to the fire.

To enable others skilled in the art, to construct and use my invention, I will proceed to describe its construction and operation.

My air box I make about ten inches thick, fourteen inches long, and broad, of cast iron plates as thin as can be conveniently cast, and join them together with screws or in any suitable way. Around the inside of the box, and in the center, I form a rabbet ($e$) by making that part of the plates forming the back chamber half the thickness of those forming the front chambers; on this rabbet or shoulder the plate ($e'$) rests, and is made air tight with white lead or putty. This plate separates the back chamber from the two front ones. From and at right angles to the plate ($e'$) I place a second partition plate ($b$) which forms the upper and lower chambers. On the back plate ($g$) there is a flange ($a$) which fits air tight around the inside of the back chamber. Through the back plate passes a tube ($c^2$) leading from the nose of the bellows into the upper chamber. In the plate ($e'$) on each side of the tube ($c^2$) is a hole ($h\ h$) leading from the upper chamber to the back chamber. In the same plate below, and opposite to the holes ($h\ h$) are two tubes ($c'\ c'$) leading from the back chamber into the lower chamber; the tubes ($c'\ c'$) come flush with one side of the plate ($e'$), but project on the other side within one inch of the back plate ($g$). From the lower chamber there is a fourth tube ($c$) leading from the lower chamber to the fire bed, and projecting inside within one inch of the plate ($e'$).

When the box is put together and made air tight, and set in the brick work of the chimney, in contact with the fire bed, and the tube ($c^2$) attached to the bellows, it is evident the air rushing from the bellows, through the tube ($c^2$) into the upper chamber, will by its reaction against the plate ($g'$) which is heated, be forced through the holes ($h\ h$) into the back chamber, and from thence through the tubes ($c'\ c'$) into the lower chamber where it will, by its coming in contact with the front plate ($g'$) be very much rarefied and by its reaction forced through the tube ($c$) with great force onto the fire.

What I claim as my invention and desire to secure by Letters Patent, is—

The construction of my air box, into three chambers, connected with tubes in the manner and for the purpose herein described.

RICHD. BREWER.

Witnesses:
F. CARMICHAEL,
JOHN HIDELEY.